US007283676B2

(12) United States Patent
Olsson

(10) Patent No.: US 7,283,676 B2
(45) Date of Patent: Oct. 16, 2007

(54) METHOD AND DEVICE FOR IDENTIFYING OBJECTS IN DIGITAL IMAGES

(75) Inventor: Andreas Olsson, Lund (SE)

(73) Assignee: Anoto AB, Lund (SE)

( * ) Notice: Subject to any disclaimer, the term of this patent is extended or adjusted under 35 U.S.C. 154(b) by 734 days.

(21) Appl. No.: 10/300,029

(22) Filed: Nov. 20, 2002

(65) Prior Publication Data

US 2003/0118233 A1    Jun. 26, 2003

Related U.S. Application Data

(60) Provisional application No. 60/333,164, filed on Nov. 27, 2001.

(30) Foreign Application Priority Data

Nov. 20, 2001   (SE)   ................................ 0103845-4

(51) Int. Cl.
*G06K 9/36* (2006.01)
*G06K 9/38* (2006.01)
(52) U.S. Cl. ...................... 382/237; 382/270
(58) Field of Classification Search ............... 382/237, 382/270
See application file for complete search history.

(56) References Cited

U.S. PATENT DOCUMENTS

| 4,584,703 | A | * | 4/1986 | Hallberg ...................... 382/140 |
| 4,593,325 | A | * | 6/1986 | Kannapell et al. ......... 358/3.22 |
| 4,675,909 | A | * | 6/1987 | Egami et al. ................ 382/172 |
| 5,051,736 | A |   | 9/1991 | Bennett et al. |
| 5,201,012 | A | * | 4/1993 | Hisano et al. .............. 382/172 |
| 5,477,012 | A |   | 12/1995 | Sekendur |
| 5,710,828 | A | * | 1/1998 | Hashimoto ................... 382/172 |
| 5,748,775 | A | * | 5/1998 | Tsuchikawa et al. ........ 382/190 |
| 5,923,776 | A |   | 7/1999 | Kamgar-Parsi |
| 5,943,448 | A | * | 8/1999 | Tatsuta ....................... 382/270 |
| 5,949,905 | A |   | 9/1999 | Nichani et al. |
| 5,960,111 | A |   | 9/1999 | Chen et al. |
| 6,208,771 | B1 |   | 3/2001 | Jared et al. |
| 6,999,620 | B1 | * | 2/2006 | Harville ...................... 382/173 |
| 2001/0005430 | A1 |   | 6/2001 | Warnick et al. |
| 2002/0037102 | A1 | * | 3/2002 | Toda .......................... 382/168 |
| 2002/0071034 | A1 | * | 6/2002 | Ito et al. ..................... 348/152 |

FOREIGN PATENT DOCUMENTS

| EP | 1 126 413 A2 | 8/2001 |
| WO | WO 00/73983 A1 | 12/2000 |
| WO | WO 01/16691 A1 | 3/2001 |
| WO | WO 01/26033 A1 | 4/2001 |
| WO | WO 01/43071 A2 | 6/2001 |
| WO | WO 01/71644 A1 | 9/2001 |
| WO | 02/01244 | 6/2002 |

* cited by examiner

*Primary Examiner*—Wenpeng Chen
*Assistant Examiner*—Yuzhen Ge
(74) *Attorney, Agent, or Firm*—Birch, Stewart, Kolasch & Birch, LLP

(57) ABSTRACT

In a method for identifying objects in a digital image which is included in a sequence of images, luminance values of a current digital image are compared with at least one threshold value in order to create a current binarized image on the basis of the comparison. A quality measure for the current binarized image is also calculated, whereupon said at least one threshold value is updated on the basis of the quality measure for use in binarization of a subsequent image. The method can be realized in the form of a computer program, a computer program product, a device, and a hand-held apparatus for position determination.

21 Claims, 7 Drawing Sheets

METHOD AND DEVICE FOR IDENTIFYING OBJECTS IN DIGITAL IMAGES

This application claims priority on provisional Application No. 60/333,164 filed on Nov. 27, 2001, the entire contents of which are hereby incorporated by reference.

FIELD OF THE INVENTION

The present invention relates in general to processing of digital images, and more particularly to thresholding or binarization of the same. The invention is particularly, but not exclusively, aimed at preparatory image processing prior to calculation of position information on the basis of the shape and/or location of objects in a digital image.

BACKGROUND TO THE INVENTION

In digital image processing, it is sometimes desirable, in what is known as a segmentation process, to separate some form of structure from a background in a digital gray-scale image. This can be done by what is known as thresholding or binarization, in which the luminance values of the pixels of the digital image are compared to a threshold value. For example, luminance values above the threshold value may be set to 1, while luminance values below the threshold value may be set to 0, or vice versa. With a well-chosen threshold value, the binarization results in a binary image with demarcated, real structures.

In a simple form of binarization, one and the same threshold value is used for the whole image. Alternatively, use is made of a threshold matrix with a threshold value for each of a number of partial areas in the image. In both cases, the threshold value(s) can be calculated on the basis of the luminance values of the digital image which is to be thresholded, for example in order to take account of luminance variations between images in a sequence of images and/or luminance variations within a particular image.

In many cases, a sequence of images is processed in a number of steps. One of the introductory steps can be the above-mentioned binarization, which aims on the one hand to locate relevant structures and on the other hand to reduce the amount of data which is processed in subsequent steps. Of course, it is desirable for the binarization to be carried out with high precision, because errors will otherwise be able to propagate in subsequent processing steps. In most cases, unfortunately, high precision can only be achieved at the cost of relatively time-consuming and memory-intensive calculations.

The above considerations have to be taken into account, for example, when calculating data, such as positions, starting from images of a pattern on a base. The pattern contains mutually distinct symbols whose shape and/or relative location code said data. The images can, for example, be recorded optically by a sensor in a hand-held apparatus, for example in the form of a pen. Such an apparatus for position determination is described, for example, in U.S. Pat. Nos. 5,051,736, 5,477,012, WO 00/73983 and U.S. Pat. No. 6,208,771B1. Here, data is calculated as positions which reflect the movement of the apparatus across the base and therefore can be used to create an electronic version of handwritten information.

The above-mentioned images can be processed in a data-processing unit, such as a suitably programmed microprocessor, an ASIC, an FPGA, etc., which receives a sequence of digital gray-scale images, binarizes these for identification of the above-mentioned symbols, and calculates a position on the basis of each binarized image. During the binarization, a threshold matrix is used which contains a threshold value for each pixel in the gray-scale image. For example, each image may contain approximately 100×100 pixels and have 8-bit resolution in luminance. Recording of handwritten information should be carried out at high temporal resolution, typically approximately 50-100 images per second, for which reason it is difficult to combine requirements for high precision in the binarization with requirements for rapid processing and small memory requirement, even in a specially-adapted data processing unit.

In most cases, the images additionally contain interferences, for example in the form of noise, lack of sharpness, uneven illumination and geometric distortion, making the identification of symbols or objects still more difficult.

SUMMARY OF THE INVENTION

It is an object of the present invention to at least partially remedy the above problems of the prior art.

More particularly, the invention aims to make available an improved image-processing technique for identifying objects in a digital image included in a sequence of images.

A further object is to make available an image-processing technique which is precise but which can also be realized in a manner that is efficient in terms of time and memory requirements.

It is also an object to make available an image-processing technique which is tolerant with respect to interferences, such as variations in sharpness, variations in background luminance, variations in signal-to-noise ratio and perspective effects, both within each image and between different images.

These and other objects which will become evident from the following description are achieved wholly or partially by means of a method according to claim 1, a computer program according to claim 22, a computer program product according to claim 23, a hand-held apparatus according to claim 24, and a device according to claim 25. Preferred embodiments are defined in the sub-ordinate claims.

The invention starts out from the knowledge that the image-processing technique claimed can be obtained by a combination of a thresholding algorithm and feedback control. More specifically, a feedback control is effected on at least one thresholding parameter used in the thresholding to achieve a set value in the form of a quality measure of the images after thresholding. The presence of a feedback control makes it possible to obtain the desired tolerance with respect to the above-mentioned interferences. Moreover, sufficient precision can also be achieved using a comparatively simple thresholding algorithm, which itself can be realized in a manner that is efficient in terms of time and memory requirement.

According to a first aspect, the invention thus relates to a method for identifying objects in a digital image included in a sequence of images. The method comprises the step of comparing luminance values of a current digital image with at least one threshold value in order to create, on the basis of the comparison, a current binarized image. The method additionally comprises the steps of calculating a quality measure for the current binarized image, and, on the basis of the quality measure, updating said at least one threshold value for use in binarization of a subsequent image.

Said at least one threshold value is preferably updated on the basis of the difference between the quality measure, which forms an actual value, and a desired quality value, which forms a set value.

The quality measure reflects some desired property of the binarized images, such as a certain size or shape of the objects. According to one embodiment which can be useful inter alia in the above-mentioned position determination, the quality measure represents the area of the objects in the current binarized image. Such a quality measure can consist, for example, of the total object area, an average value of the object area, a distribution of the object area, a ratio between the object area and the background area in the binarized image, etc. Such a quality measure, in the form of an aggregate value for a plurality of objects in the binarized image, is relatively insensitive to perspective-related image distortions. For example, a perspective involves the area of the objects increasing in one part of the image and decreasing in another; on average, however, the area of the objects is essentially the same, regardless of perspective.

The above-mentioned tolerance to interference may be achieved by using a threshold matrix containing threshold values which are designated to different partial areas of the current image, where each partial area comprises a plurality of pixels. Such a threshold matrix can be calculated in a rapid and memory-efficient manner by a background luminance value and an object luminance value being estimated for each partial area of the current image, and by the threshold values of the threshold matrix being updated on the basis of said background luminance value and said object luminance value. This threshold matrix is thus calculated on the basis of statistical image data for the partial areas in the current image and thereby contains threshold values which are related to the overall luminance distribution in this image, both with respect to the background and to the objects. In an alternative embodiment, however, the threshold matrix may contain only one threshold value.

The threshold value(s) of the threshold matrix may be updated on the basis of at least one contrast depth factor, which indicates the relative position of the threshold value between the background luminance value and the object luminance value. The binarization is preferably controlled via this contrast depth factor. In this case, the quality measure of the current binarized image is thus used to determine the contrast depth factor before the next binarization.

According to one embodiment, one and the same contrast depth factor is used for calculating the entire threshold matrix.

According to an alternative embodiment, a contrast depth factor is determined for each one of a number of control partial areas in the current binarized image, whereupon the resulting set of contrast depth factors is used for calculating the threshold matrix.

One embodiment involves a control loop in which each iteration comprises: retrieving a current image; estimating the contrast distribution of the current image; calculating the threshold value(s) of the threshold matrix, based on said contrast distribution and a contrast depth factor calculated during the preceding iteration; creating a current binarized image on the basis of the threshold matrix; calculating a quality measure of the current binarized image; calculating an error between a set value and the quality measure; and calculating a new contrast depth factor based on the preceding contrast depth factor and said error. The contrast distribution of the current image can be estimated, for example, based on the above-mentioned background luminance and object luminance values for different partial areas.

The control loop may be designed to work with essentially constant poles. Such a control loop can be based on a model function which relates the quality measure to the preceding contrast depth factor and which includes at least one model function operating point which is essentially common to all digital images in the sequence of images, i.e. for all operating conditions. A new contrast depth factor can thus be calculated by parameterizing the model function on the basis of the preceding contrast depth factor and said model function operating point. The parameters of the model function can thus be calculated for each iteration, whereupon the control parameters of the control loop can be adjusted to achieve essentially constant poles. These poles can be chosen to achieve a desired stability and/or response time of the control loop.

The model function is preferably defined at least around the set value. For reasons relating to automatic control engineering, it is further preferred, but not necessary, for the model function to be a linear function.

According to one embodiment, the quality measure is set equal to the set value in the parameterizing of the model function. Such an embodiment may be preferred with respect to the stability of the control loop.

According to an alternative embodiment, the parameterizing of the model function is further based on the quality measure which has been calculated for the current binarized image. Such an embodiment may be preferred with respect to the response time of the control loop.

According to a further embodiment, intermittent updating of the set value is also effected on the basis of the quality measure, preferably on the basis of the new contrast depth factor which is calculated based on the quality measure. Such updating can take place based on a measured relationship between an optimum set value for different operating conditions and the associated contrast depth factor. The new contrast depth factor which is output by the control loop during each iteration can thus also be used, via this measured relationship, to calculate an updated set value.

To go back to the position determination discussed by way of introduction, the control loop can be designed to achieve a given area on the objects in each of the binarized images. Such a set value is of course established in the knowledge both of the imaging system and of the original size of the objects on the base which is being imaged. In practice, however, it is difficult to translate the original size of the objects to an optimum size of the objects in the images. For example, the imaging is influenced by the quality of the base, for example with respect to the absorbance/reflectance of the objects. Moreover, the objects on the base can deviate from their intended original size on account of inaccuracies in the printing or print-out process. Alternatively, there may be no clear original size, for example if the base has intentionally been provided with position-coding objects of different sizes, for example in order to embed the position-coding pattern in graphic information, as is described in the Applicant's International Patent Publication WO 01/71644, which is incorporated herein by reference.

In all these cases, it is an advantage to effect the above-mentioned intermittent updating of the set value, in that the control loop is able to automatically adapt itself to the base.

Further aspects of the invention concern a computer program, a computer program product, a hand-held apparatus for position determination, and a device for identifying objects in a digital image.

The advantages of the computer program, the computer program product, the hand-held apparatus and the device will be evident from the above description. The features which are described in connection with the method of identifying objects in a digital image are, of course, applicable also to these further aspects.

BRIEF DESCRIPTION OF THE DRAWINGS

The invention will be described below, with reference to the accompanying drawings which, for the purpose of exemplification, show currently preferred embodiments.

DESCRIPTION OF PREFERRED EMBODIMENTS

The description below concerns position determination based on gray-scale images of a position-coding pattern. The position-coding pattern can be of any type, for example any one of the patterns mentioned by way of introduction In the following, however, the invention is illustrated in connection with the pattern which is described in the Applicant's International Patent Publications WO 01/16691 and WO 01/26033. This pattern is described briefly below with reference to FIG. 1.

The position-coding pattern comprises a virtual raster 10, which thus is neither visible to the human eye nor can be detected directly by a device which is to determine positions on the surface, and a plurality of marks 11, each of which, depending upon its position, represents one of four values "1" to "4". The value of the mark 11 depends upon where it is placed in relation to its nominal position 12. The nominal position 12, which can also be called a raster point, is represented by the point of intersection between the raster lines.

In one embodiment, the distance between the raster lines is 300 µm and the angle between the raster lines is 90 degrees. Other raster intervals are possible, for example 254 µm to suit printers and scanners which often have a resolution which is a multiple of 100 dpi, which corresponds to a distance between points of 25.4 mm/100, i.e. 254 µm.

Figure 1:
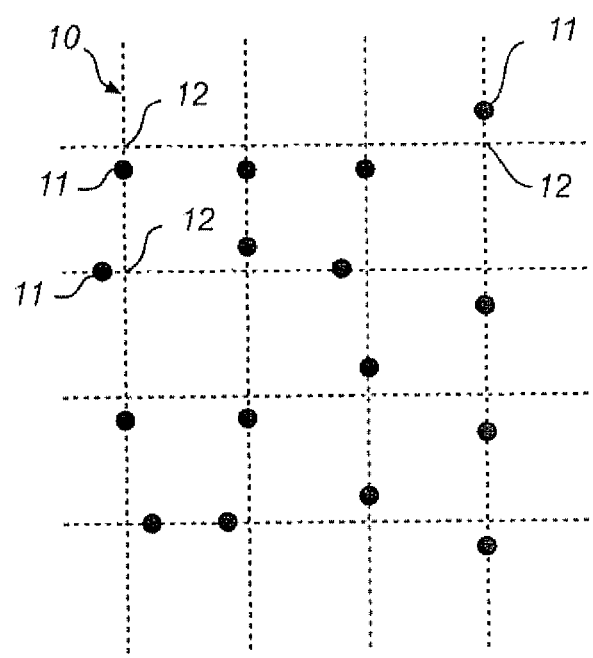
FIG. 1 is a schematic view of a set of 4×4 objects in a position-coding pattern.

In the example in FIG. 1, there are four possible positions,)one on each of the raster lines extending from the nominal position 12. The displacement from the nominal position 12 is the same size for all values. Each mark 11 is, at its central point, displaced relative to its nominal position 12, i.e. no mark is located at the nominal position. In addition, there is only one mark 11 per nominal position 12.

In one embodiment, the marks 11 are displaced relative to the nominal positions 12 by 50 µm along the raster lines. The displacement is preferably ⅙ of the raster interval, as it is then relatively easy to determine to which nominal position a particular mark belongs. The displacement should be at least approximately ⅛ of the raster interval, since otherwise it can be difficult to determine a displacement, i.e. the requirements for resolution become great. On the other hand, the displacement should be less than approximately ¼ of the raster interval, in order for it to be possible to determine to which nominal position a mark belongs.

Each mark 11 consists of a more or less circular dot with a radius which is approximately the same size as the displacement or somewhat less. The radius can be between 25% and 120% of the displacement. If the radius is much larger than the displacement, it can be difficult to determine the raster lines. If the radius is too small, greater resolution is required to record the marks. The marks do not, however, need to be circular or round, and instead they can have any suitable shape, such as square, triangular, elliptical, filled, open, etc.

The pattern described above can be designed to code a very large number of absolute positions. For example, the pattern can be such that 6×6 adjacent marks together code a position, in the form of an x-coordinate and a y-coordinate. If a subset of the pattern is applied to a product, it is possible to obtain an electronic representation of what is written or drawn on the product using a pen, by continually determining the position of the pen on the product by reading off the local combination of marks. This reading can be carried out by optical detection.

Figure 2:
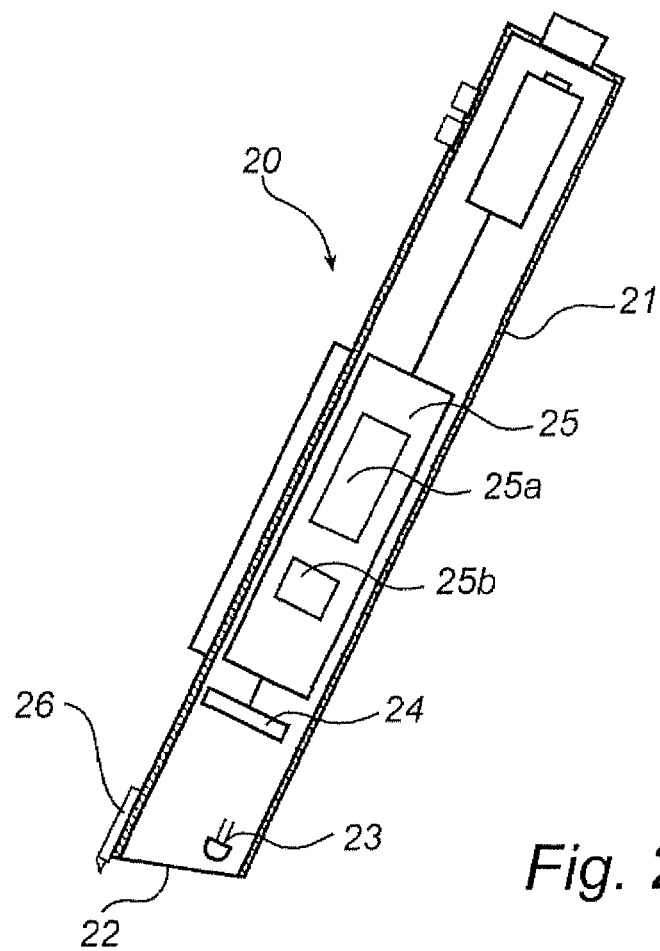
FIG. 2 is a schematic view of a hand-held sensor device which can be used to detect the position-coding pattern in FIG. 1.

FIG. 2 shows a hand-held apparatus 20, below called a pen, which is used for optical detection of the position-coding pattern in FIG. 1. The pen's main components are described briefly below. For a more complete description, reference may be made to the above-mentioned WO 01/16691 and WO 01/26033.

The pen 20 has a casing 21 which is in the shape of a pen and which delimits an opening 22 at one short side. The short side is intended to abut against or to be held a short distance from the surface on which the position determination is to be carried out.

One or more infrared light-emitting diodes 23 are arranged at the opening 22 for illuminating the surface area which is to be imaged, and an IR-sensitive area sensor 24, for example a CCD or CMOS sensor, is arranged to record a two-dimensional image of the surface area.

The area sensor 24 is connected to a data processor 25 which is arranged to determine a position on the basis of the image recorded by the sensor 14. The data processor 25 can contain a processor means 25a which is programmed to process images from the sensor 24, or from a memory means 25b assigned to the sensor 24, for position determination on the basis of these images.

The processor means 25a can include a microprocessor, such as a CPU (Central Processing Unit), a DSP (Digital Signal Processor) or some other programmable logic device, such as an FPGA (Field-Programmable Gate Array). The processor means 25a can alternatively, or additionally, include a hardware circuit such as an ASIC (Application-Specific Integrated Circuit) and/or discrete analog and digital components.

The memory means 25b preferably comprises different types of memory, such as working memory (RAM), reading memory (ROM/FLASH) and writing memory (FLASH). In a known manner, the working memory can store data while this is being processed by means of the processor means 25a, the reading memory can store the program code which is executed by the processor means 25a in the working memory, and the writing memory can store the result of the processing, such as position coordinates.

The pen 20 also has a pen point 26 which applies marking fluid to the base. Using this, the user can write physically and visually on the base, while at the same time what is being written is recorded digitally via optical detection of the position-coding pattern. The marking fluid is suitably transparent to infrared light, while the marks 11 on the position-coding pattern (FIG. 1) absorb infrared light. This means that the marking fluid does not interfere with the detection of the pattern.

When the pen 20 is moved across the position-coding pattern, the area sensor 24 thus records a sequence of digital gray-scale images which are transmitted to the data processor 25 for position determination. In one embodiment, the gray-scale images contain 96×96 pixels, the luminance values of which are given with 8-bits resolution. To achieve an adequate temporal resolution for the digitally recorded information, images are read off from the area sensor 24 at a frequency of approximately 100 Hz.

In the images, the marks 11 (FIG. 1) appear as dark dots against a light background. Each mark or object normally covers several pixels. The sharpness can vary within the image as a result of the pen 20, and thereby the area sensor 24, being angled in relation to the base when writing down information. The contrast can also vary within the image as a result of uneven scattering properties of the base. In addition, the illumination of the base may be uneven. In general, this leads to variations in sharpness, contrast, signal-to-noise ratio, and illumination within each image. In addition, there are corresponding variations between different images, since the angle of inclination of the pen varies with time while information is being written down, and also between different users and bases.

Figure 3:
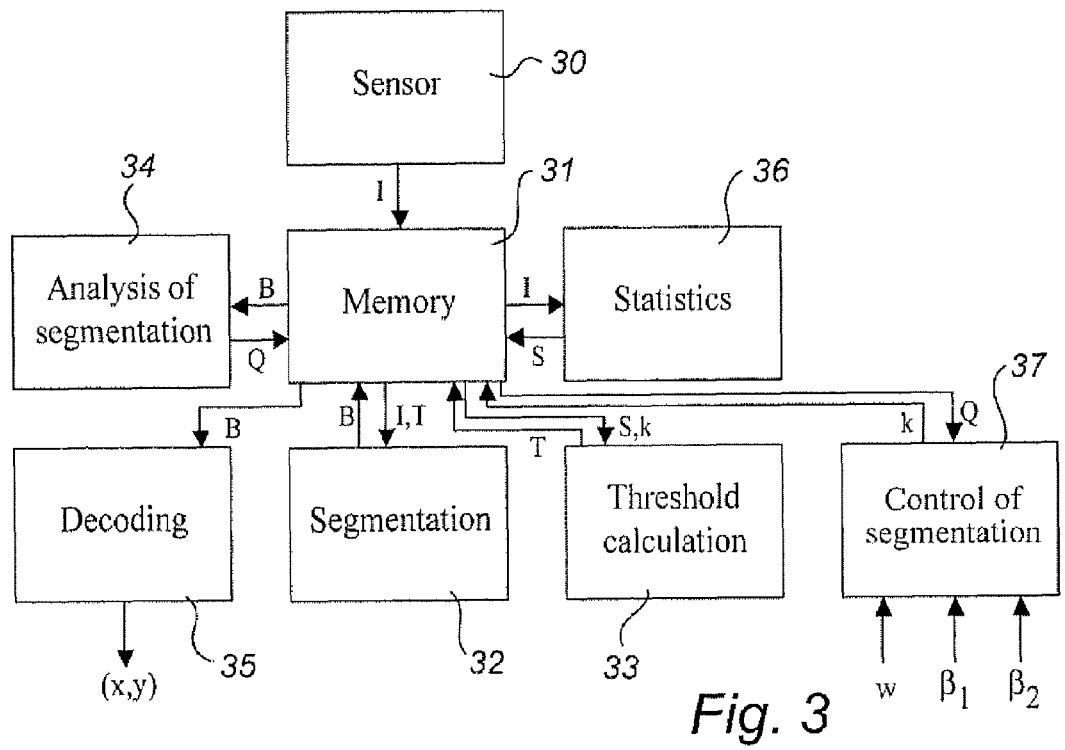
FIG. 3 is a block diagram showing parts of a device according to the invention, and the exchange of information between these parts.

FIG. 3 shows a block diagram of relevant parts of the data processor according to FIG. 2. A gray-scale image I is recorded by means of the sensor 30 (corresponding to the area sensor 24 in FIG. 2) and is transferred for storage to a memory module 31, for example the above-mentioned working memory or writing memory. If necessary, a plurality of images can be buffered in the memory module 31 to await decoding. A segmentation module 32 reads a gray-scale image I from the memory module 31 and then thresholds this using a threshold matrix T which is obtained from a threshold calculation module 33. The segmentation module 32 compares the luminance value of each pixel in the current image I with an associated threshold value in the threshold matrix T. If the luminance value is greater than the threshold value, the corresponding luminance value of the binary image is set to one (1), otherwise to zero (0). The resulting binary image B thus contains dark objects (value 0), ideally constituting the marks, against a light background (value 1). The binary image B is then saved in the memory module 31.

The binary image B is then read by an analysis module 34 which calculates a quality measure Q of the image B, as will be described in more detail below. Finally, the binary image B is processed in a decoding module 35 which processes the information in the image B for decoding of position coordinates (x,y) on the basis of the positions of the objects in relation to the virtual raster. The decoding module 35 will not be described in detail here since the present invention concerns the preprocessing step, more specifically the binarization of the gray-scale images I. The decoding module is further described in aforesaid WO 01/26033.

The incoming gray-scale image I is also processed by a statistics module 36 which generates image statistical data S for given partial areas or sub-regions in the current gray-scale image I. This image statistical data S is preferably stored in the memory module 31, from which the threshold calculation module 33 can obtain current image statistical data S when it is to begin the calculation of a new threshold matrix T.

The data processor further comprises a control module 37 which reads a desired value or set value w, control parameters $\beta_1$, $\beta_2$, and the quality measure Q calculated by the analysis module 34, and calculates a contrast depth factor k which in turn is used by the threshold calculation module 33 to calculate the threshold matrix T.

It should be understood that each of the above modules 32-37 can be realized in the data processor 25 in the form of a software-controlled processor, a specially adapted hardware circuit, discrete analog/digital components, or some combination thereof.

In the presently preferred embodiment, threshold calculation module, analysis module, decoding module and control module 34-35, 37 are implemented as a software-controlled microprocessor, while the segmentation and statistics modules 32, 36 are implemented as an ASIC which operates on large data sets without loading the microprocessor. To further reduce the load on the microprocessor, the gray-scale images are input from the sensor 30 to the memory module 31 via DMA (Direct Memory Access).

Figure 4:
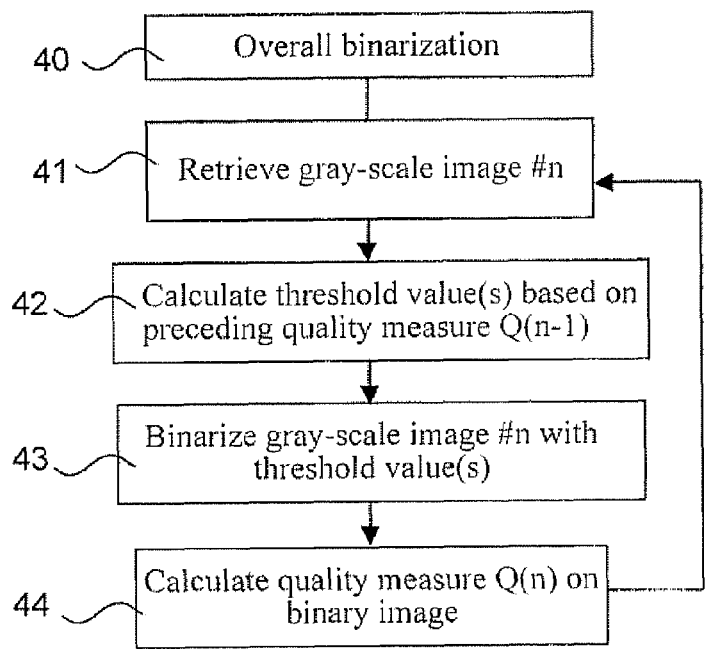
FIG. 4 is a flow chart showing the overall steps in a method according to the invention for identifying objects in digital images.

FIG. 4 shows overall process steps carried out in the system according to FIG. 3. In the system, a current gray-scale image #n is first collected, step 41. In step 42, the quality measure Q(n−1) for a preceding binary image is input and a current threshold matrix T(n) is calculated on the basis of this quality measure. In step 43, the segmentation module 32 then reads the current threshold matrix T(n), compares it to the current gray-scale image and creates a current binary image. In step 44, the analysis module 34 calculates a quality measure Q(n) of the current binary image. After step 44, the execution of the steps returns to step 41.

The threshold calculation module 33, the analysis module 36 and the control module 37 will be individually described in greater detail below.

Threshold Calculation Module

The threshold calculation module 33 (FIG. 3) is designed to estimate the contrast in a number of partial areas of the current gray-scale image I and, on the basis of the contrast, to calculate a threshold value per partial area. A detailed description of the threshold calculation module is to be found in the Applicant's International Patent Application PCT/SE02/01244 which is incorporated herein by reference. A summary of the principles which lie behind the threshold calculation module is given below, followed by an example.

The contrast within each partial area is estimated as the difference between a background luminance value and an object luminance value, which are in turn estimated for each partial area. The background luminance value and the object luminance value are preferably estimated on the basis of first-order statistics of the luminance values of the pixels included in each partial area. First-order statistics, for example including the minimum value, the maximum value, the median value, the mean value and the total of the luminance values of the pixels within a partial area, can be extracted from the gray-scale image I via the statistics module 36 in a calculation-efficient manner.

In the case of gray-scale images with dark objects against a light background, the background luminance value can be estimated on the basis of the greatest luminance value of the pixels within each partial area. Alternatively, the background luminance value can be estimated on the basis of the mean value of the luminance values of the pixels within each partial area. According to another alternative, the background luminance value is estimated on the basis of a percentile value, for example in the range of 80-95, for the luminance values within each partial area.

Correspondingly, the object luminance value can be estimated on the basis of the lowest luminance value of the pixels within each partial area.

The above principle can be refined by the background luminance values and the object luminance values being estimated for background partial areas and object partial areas, respectively, whose sizes are adapted for optimum estimation of each value, as will become apparent from the example below.

Figure 5:
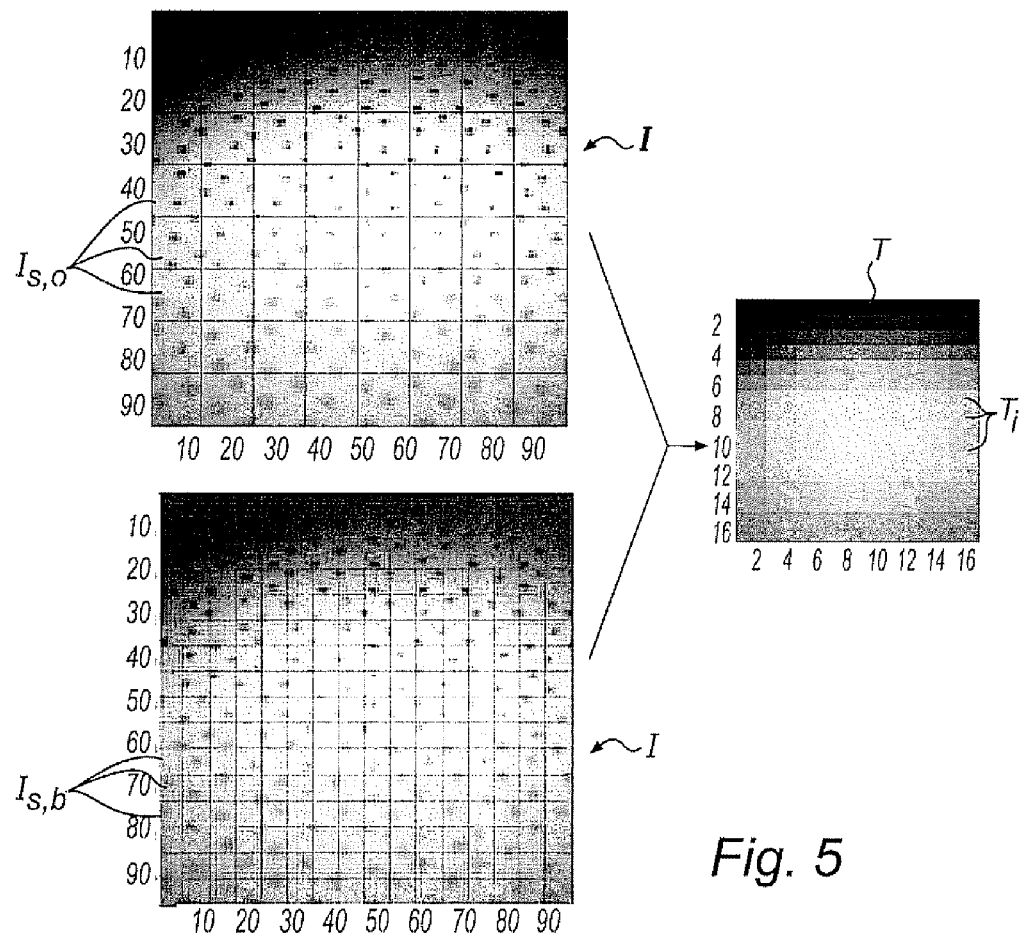
FIG. 5 is a view which illustrates schematically the partition of a gray-scale image into partial areas for calculating a threshold matrix.

FIG. 5 illustrates calculations of a threshold matrix in accordance with the above-mentioned principles, starting from gray-scale images of 96×96 pixels. Each gray-scale image is divided into 64 (8×8) object partial areas $I_{s,o}$ which each contain 12×12 pixels, or 256 (16×16) background partial areas $I_{s,b}$ which each contain 6×6 pixels. The partial areas $I_{s,o}$, $I_{s,b}$ are delimited by thin lines in FIG. 5. This partitioning is used on the one hand by the statistics module 36 for generating image statistics data S, and on the other hand by the threshold calculation module 33 for calculating the threshold matrix T. The partitioning is adapted to the coding pattern in FIG. 1.

In this example, the threshold matrix is thus calculated starting from image statistics data for two different sets of partial areas, namely object partial areas on the one hand and background partial areas on the other. The object partial areas and the background partial areas overlap each other and each cover the whole part of the image which is to be binarized. The object partial areas are large enough to be certain to contain at least part of a mark. The upper limit for the size of the object partial areas is set by the least acceptable resolution for the threshold matrix, which depends inter alia on the spatial size of the luminance variations in the images. By contrast, the background partial areas can be made smaller because they only need to be large enough to be certain to contain pixels which are representative of the local background luminance of the image, i.e. they should be larger than each mark in the image. Here, account should be taken of a possible magnification as a result of perspective effects.

It should also be noted that the object partial areas $I_{s,o}$ in this example are dimensioned so as to include a whole number (in this case four) of background partial areas $I_{s,b}$, which facilitates the calculation of the threshold matrix T.

The threshold calculation module 33 (FIG. 3) is designed to calculate a threshold value for each background partial area, in accordance with:

$T_i = b_i - k*(b_i - o_i),$ where $b_i$ is the estimation of the background luminance within the background partial area $I_{s,b}$, and $o_i$ is the estimation of the object luminance within the larger object partial area $I_{s,o}$ which overlaps the current background partial area $I_{s,b}$. In this example, the background luminance is estimated as the greatest luminance value within the background partial area and the object luminance as the lowest luminance value within the object partial area. In this example, the statistics module 36 (FIG. 3) thus extracts image statistics data S in the form of the greatest luminance value (max) and the lowest luminance value (min) within the partial areas $I_{s,b}$ and $I_{s,o}$.

The contrast depth factor k ($0 \leq k \leq 1$) determines to which contrast depth the threshold value will be set. For k=0, the threshold value is set level with the background luminance value, and for k=1 the threshold value is set level with the object luminance value. The threshold calculation module 33 obtains a current value of the factor k from the control module 37. In the example described, this factor is assigned the same value for all partial areas.

After the above calculation, the threshold matrix T contains one threshold value $T_i$ per background partial area $I_{s,b}$ (FIG. 5).

Analysis Module

The analysis module 34 (FIG. 3) is designed to calculate the quality measure Q for the current binary image. The choice of quality measure is of course dependent on what type of object is to be identified in the gray-scale images.

For identification of the marks in the position-coding pattern according to FIG. 1, it has proven useful to base the quality measure on the size of the objects in the binary image. The quality measure is preferably calculated for the whole image, or at least for an image area which with certainty contains several objects. This minimizes the effect of the geometric distortion on the quality measure, caused when the pen, and thereby the area sensor, is inclined relative to the position-coded base.

The analysis module 34 can thus be designed to total the number of object pixels (value 0) in the binary image, for calculating the total size of the objects.

Alternatively, the analysis module 34 can be designed to calculate an average object size in the image by totaling the number of object pixels, identify the number of groups of contiguous object pixels which can be assumed to form objects, and form the quotient of these number values.

According to a further alternative, the analysis module 34 can be designed to identify all groups of contiguous object pixels which can be assumed to form objects, calculate the size of each group, and form a histogram of the size distribution of the groups or extract some measure thereof.

Control Module

Figure 6:
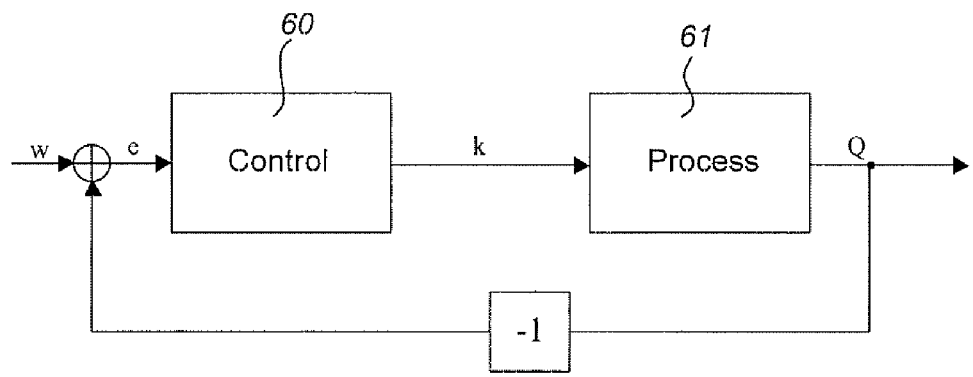
FIG. 6 is a block diagram illustrating a control loop according to a first embodiment of the method according to the invention.

The control module can be illustrated as part of a control system according to FIG. 6. The control module 60 (corresponding to the control module 37 in FIG. 3) operates on a process 61 which is effected in the threshold calculation module 33, the segmentation module 32 and the analysis module 34 in FIG. 3. The control module 37 is designed to calculate the contrast depth factor k on the basis of the difference e between the set value w and an actual value in the form of the quality measure Q of a preceding binary image. This contrast depth factor k is then used by the process 61 in order to calculate a current threshold matrix and, with this, to create a current actual binary image from a current gray-scale image.

Figure 7:
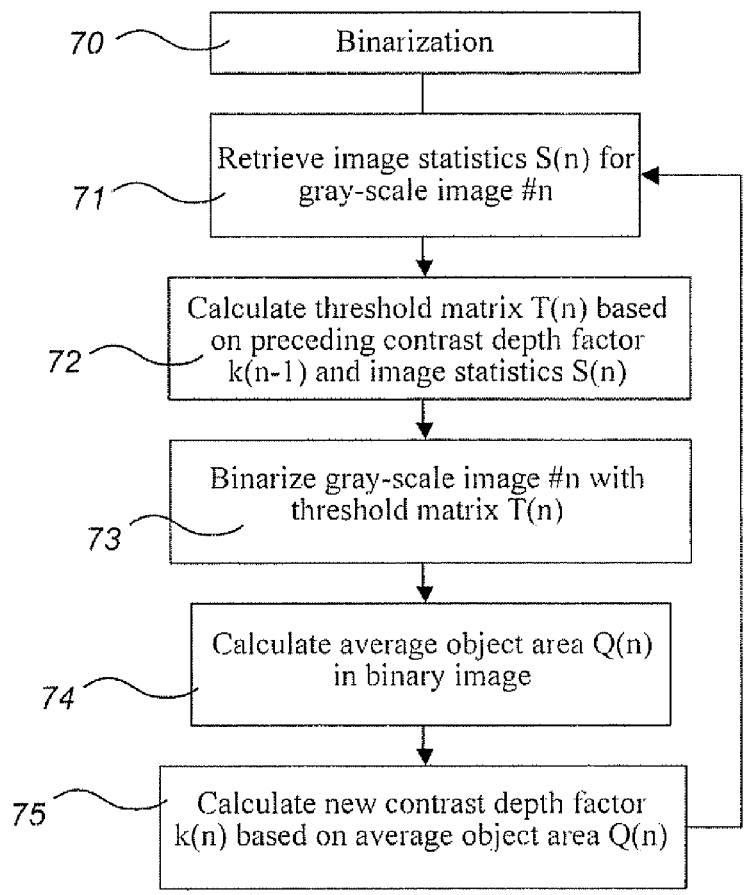
FIG. 7 is a flow chart which illustrates in greater detail the first embodiment of the method according to the invention.

FIG. 7 shows in more detail the steps of the process carried out in the system according to FIGS. 3 and 6. In a first step 71, image statistics S(n) for the current gray-scale image are retrieved. In step 72, which is carried out in the threshold calculation module 33 in accordance with the above description, a current threshold matrix T(n) is calculated based on a preceding contrast depth factor k(n−1) and the image statistics S(n). Thereafter, in step 73, the current gray-scale image is binarized with the threshold matrix T(n). In the subsequent step 74, the average object size in the current binary image is calculated and is used as the quality measure Q(n). In step 75, which will be discussed in more detail below, a new contrast depth factor k(n) is then calculated. The execution procedure then returns to step 71.

Figure 8:
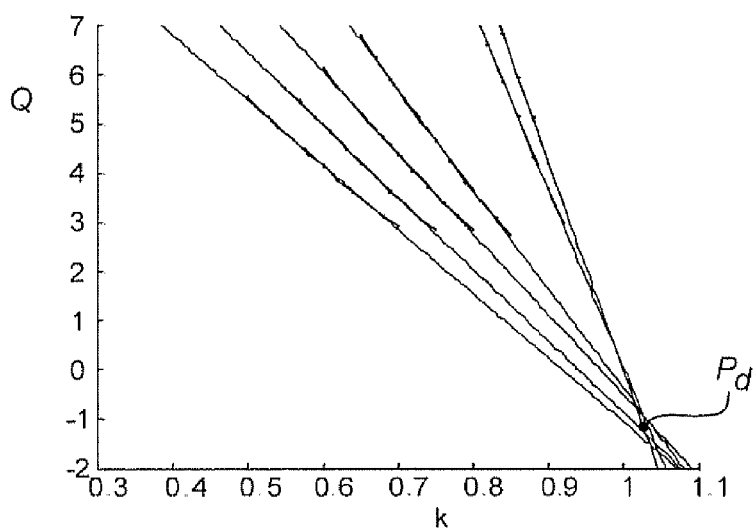
FIG. 8 is a diagram of the measured relationship between mean object area Q and contrast depth factor k for different bases, and a model function which approximates the relationship about a set value w.

The above control system comprises a control loop of first order, as the new threshold matrix is calculated before the next gray-scale image is binarized. FIG. 8 shows the transfer function for the process 61 in FIG. 6. More specifically, a measured relationship is shown between the average object size Q and the contrast depth factor k for six different bases with position-coding patterns according to FIG. 1. Both the paper quality and the object size vary between the different bases. In FIG. 8, the full lines indicate the measurement points for each base, and the broken lines indicate linear approximations for the measurement points. It will be evident that the transfer function can be approximated with a linear model function about a set value w:

$$Q(n) = \alpha \cdot k(n-1) + C,$$

where $\alpha$ and C are constants, and n is the time step. Here, the control loop can be expressed as a conventional PI loop:

$$k(n) = \alpha_1 \cdot (w(n) - Q(n)) + \alpha_2 \cdot \sum_{m=0}^{n} (w(m) - Q(m)),$$

where w(n) is the desired average object size, and $\alpha_1$, $\alpha_2$ are control parameters.

By defining $\Delta k(n) = k(n) - k(n-1)$, it is possible to eliminate the summation by rewriting the control loop as $$\Delta k(n) = \alpha_1 \cdot (\Delta w(n) - \Delta Q(n)) + \alpha_2 \cdot (w(n) - Q(n)).$$

This results in $$\Delta Q(n) = \alpha \cdot k(n-1) = \alpha \cdot \alpha_1 \cdot (\Delta w(n-1) - \Delta Q(n-1)) + + \alpha \cdot \alpha_2 \cdot (w(n-1) - Q(n-1))$$

which can be rewritten and transformed to a transfer function for a closed loop system:

$$G_c(z) = \frac{(\alpha \cdot \alpha_1 + \alpha \cdot \alpha_2) \cdot z^{-1} - \alpha \cdot \alpha_1 \cdot z^{-2}}{1 + (\alpha \cdot \alpha_1 + \alpha \cdot \alpha_2 - 1) \cdot z^{-1} - \alpha \cdot \alpha_1 \cdot z^{-2}}.$$

The poles of the transfer function are:

$$z = \frac{1 - \alpha \cdot \alpha_1 - \alpha \cdot \alpha_2}{2} \pm \sqrt{\frac{(1 - \alpha \cdot \alpha_1 - \alpha \cdot \alpha_2)^2}{4} + \alpha \cdot \alpha_1}$$

The positioning of the poles affects the stability and response time of the control system. For example, a criterion for stability is that all the poles lie within the unit circle. It is therefore possible to investigate the poles with respect to the control parameters $\alpha_1$, $\alpha_2$ for a given value of the constant $\alpha$ and, from this, to choose values of the control loop parameters which give the desired performance of the control system. Generally speaking, the control system should be as rapid as possible, but not at the expense of too much oscillation.

A relationship for the control loop will now be established. If e(n)=w(n)−Q(n), this gives $$\Delta k(n) = k(n) - k(n-1) = \alpha_1 \cdot \Delta e(n) + \alpha_2 \cdot e(n)$$

$$\Leftrightarrow$$

$$k(n) = k(n-1) + \alpha_1 \cdot (e(n) - e(n-1)) + \alpha_2 \cdot e(n)$$

The integration is implicit in the above relationship. This therefore avoids problems with integration windup. If the output signal becomes saturated at the time n, the saturated value can in other words be used, and at the time n+1 the above relationship can be used again without account of preceding events.

To return to the positioning of the poles, this is therefore dependent, according to the above, on the value of $\alpha$, which in turn may vary considerably depending on the operating conditions of the sensor device, for example as a result of changes in the properties of the base, such as the objects' size, shape quality or absorbance. If $\alpha_1$ and $\alpha_2$ are set to constant values, these must be chosen in accordance with the highest conceivable value of $|\alpha|$ in order to ensure that oscillations do not occur under any circumstances. Such a control loop could be usable in some cases when it is possible to tolerate a relatively slow response to rapid changes in the environment of the sensor device.

In an alternative embodiment, the control loop is designed to work with substantially constant poles, independently of the operating conditions. This embodiment makes use of the fact that the model function $Q(n) = \alpha \cdot k(n-1) + C$, for all relevant operating conditions, has a substantially invariant operating point. It can be seen from FIG. 8 that all model function curves substantially converge towards an model operating point ($P_d$: $Q_d$, $k_d$), in this example with an average object size around −1 for a contrast factor of about 1.05. Since Q(n)=w=constant in the steady state, the value of $\alpha$ can be calculated instead to be set to a constant:

$$\alpha = \frac{w - Q_d}{k(n-1) - k_d}$$

In light of the above, the control system, by this calculation of $\alpha$, can be modified to have substantially constant poles:

$$\alpha \cdot \alpha_1 = \beta_1 \Leftrightarrow \alpha_1(n) = \beta_1 \cdot \frac{k(n-1) - k_d}{w - Q_d}$$

and $$\alpha \cdot \alpha_2 = \beta_2 \Leftrightarrow \alpha_2(n) = \beta_2 \cdot \frac{k(n-1) - k_d}{w - Q_d}.$$

This gives the final version of the control loop for the binarization:

$$\begin{cases} k(n) = k(n-1) + \alpha_1(n) \cdot (e(n) - e(n-1)) + \alpha_2(n) \cdot e(n) \\ e(n) = w - Q(n) \\ \alpha_1(n) = \beta_1 \cdot \dfrac{k(n-1) - k_d}{w - Q_d} \\ \alpha_2(n) = \beta_2 \cdot \dfrac{k(n-1) - k_d}{w - Q_d} \end{cases}$$

where $\beta_1$ and $\beta_2$ are chosen in accordance with the above discussions concerning stability and response time, w is the desired average object size after binarization, and Q(n) is the average object size after binarization of the current image. The optimum values of the control parameters $\beta_1$ and $\beta_2$ and the set value w can be determined by testing, as will be obvious to person skilled in the art. For example, successful tests have been carried out with $\beta_1=0$, i.e. using a fully integrating control loop, $\beta_2=0.9$, and w=4, i.e. an average object area of 4 pixels.

Figure 12:
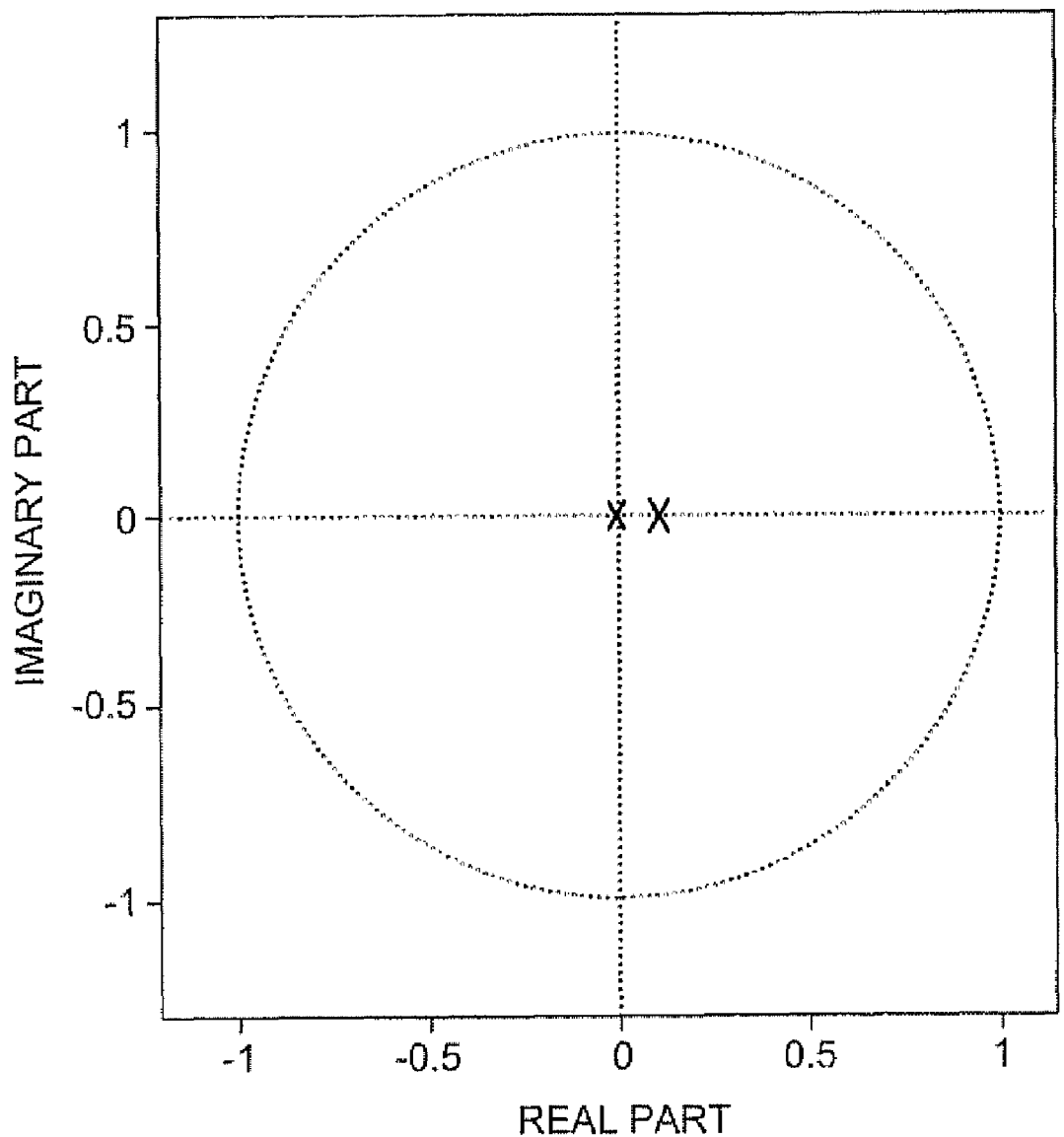
FIG. 12 is a pole plot which exemplifies a pole placement for an embodiment of a control loop designed to work with essentially constant poles.

This particular example is further illustrated in the pole plot of FIG. 12, in which the essentially constant poles are indicated in the complex z plane by an x at z=0 and z=0.1, and the unit circle is indicated by a dotted line.

As an alternative to setting the average object size Q(n) equal to the set value w in the parameterizing of the model function, in order to obtain essentially constant poles, independently of the operating conditions, it is possible to use the real average object size after binarization of the current image, i.e. the actual value Q(n). This procedure can potentially give an even more rapid control system, but at the expense of an increased risk of instability in the control system. However, in the example which is given above and which is illustrated in FIG. 8, the system stability is not impaired to any appreciable extent because the model function, even at a distance from the set value w, well reflects the real dependence between the average object size Q and the contrast depth factor k. Parameterization based on the set value w, on the other hand, could provide for greater flexibility in selection of model function with adequate stability of the control system.

As illustrated above, the control loop is designed to work with essentially constant poles. Generally speaking, the control loop is then based on a model function which represents a physical relation between the actual value Q(n), in this case the average object size, and the preceding contract depth factor k(n−1), and which is intermittently adjusted to a current operation condition of the pen, so that the control loop operates with essentially constant poles, independent of operation condition of the pen. Such adjustment may be achieved if the model function includes at least one model operating point which is essentially common to all digital images in the sequence of images, i.e. for all operating conditions. In the above example, the model function is a linear first order function of contrast depth factor, and the common model operating point is given by $P_d=(Q_d, k_d)$.

A new contrast depth factor can thus be calculated by parameterizing the model function on the basis of the preceding contrast depth factor and the common model operating point. The term parameterizing as used herein refers to a step of calculating such parameters ($\alpha$ in the above example) of the model function that are relevant to the poles of the corresponding closed loop transfer function. The parameters of the model function can be calculated intermittently, for example during each iteration of the control loop, whereupon corresponding control parameters of the control loop can be adjusted to achieve essentially constant poles.

It should perhaps be pointed out that the common model operating point does not need to constitute an actual operating point for the working control loop. The model operating point can thus lie outside the control region of the control loop and only be used as a secondary condition for calculating the model function parameters.

In the embodiment according to FIGS. 3-8, a set value is applied which is assumed to be suitable for all operating conditions. However, it can be difficult to determine such a universal set value. In the above example, the object size in the binary images is used as quality measure. The optimum object size, i.e. the set value, is here applied in the knowledge of the nominal size of the marks in the coding pattern (cf. FIG. 1) and of any magnification in the imaging process from the base to the area sensor. It has been found, however, that the optimum object size is also dependent on the operating conditions, especially the properties of the base, such as its reflectance of IR light, its surface smoothness, the printing ink's absorbance of IR light, the degree of blackening of the marks, etc. Moreover, the real size of the marks can deviate from its nominal value, for example on account of interference during application of the marks.

Figure 9:
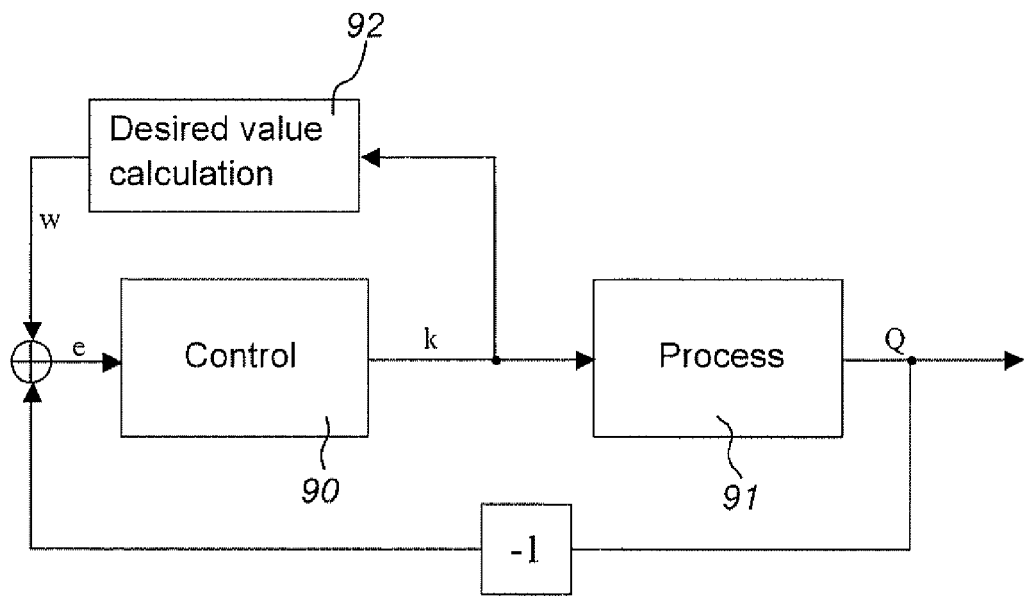
FIG. 9 is a block diagram illustrating a control loop according to a second embodiment of the method according to the invention.

FIG. 9 shows an alternative embodiment which meets the above requirements. The control system according to FIG. 9 contains a control module 90 which corresponds to the control module 60 in FIG. 6 and which operates on a process 91 which corresponds to the process 61 in FIG. 6. The control system further contains a calculation module 92 for the set value, which module intermittently updates the set value w on the basis of the current contrast depth factor k which is output by the control module 90.

It has been surprisingly found in fact that there is a relationship between the optimum object area in binary images for a given operating condition (with given properties of the base) and the corresponding contrast depth factor which is calculated by the control module according to the above description. The optimum object area can be defined as the set value which, for a type of base, gives the best identification of the objects, as seen over all the permitted inclinations of the pen relative to the base. There are different possible criteria for the optimum object area, such as the smallest number of wrongly identified objects, the maximum certainty in calculation of positions, etc.

Figure 10:
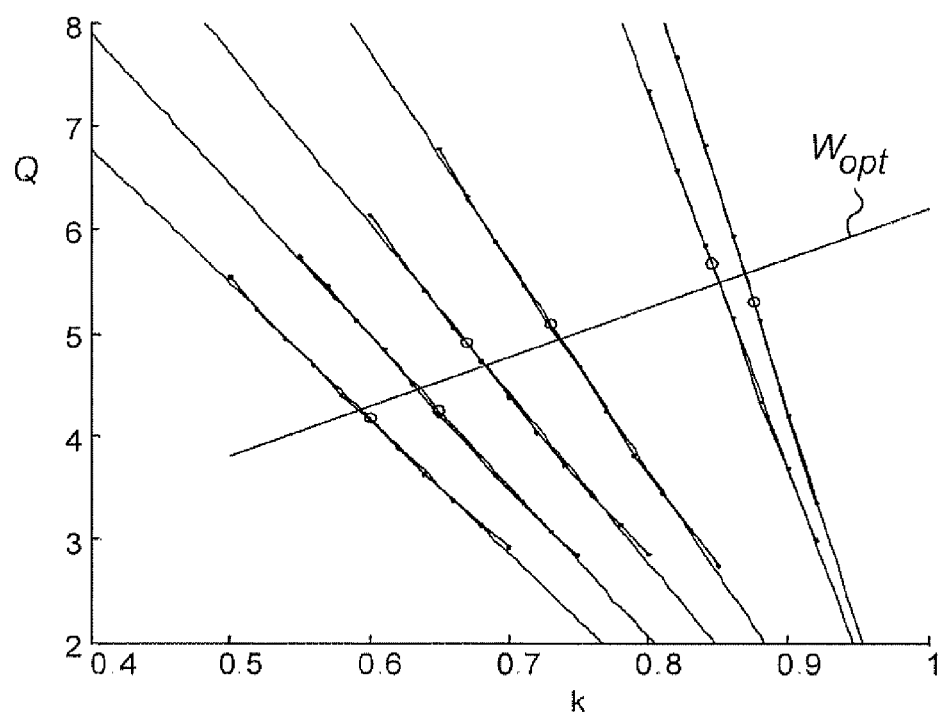
FIG. 10 is a diagram of the measured relationship between optimum set value $W_{opt}$ and an associated contrast depth factor k for different operating conditions.

FIG. 10 shows part of FIG. 8 in more detail. For each curve (full line), i.e. each base, the optimum operating point (open circle) is also indicated, i.e. the operating point which gives an optimum object area for the respective base. FIG. 10 also shows a straight dotted line which has been fitted to the optimum operating points via regression analysis and which is given by the functional relationship $w_{opt}=\delta \cdot k + \gamma$, where $\gamma=1.4$ and $\delta=4.8$.

The calculation module 92 thus uses this functional relationship to determine an optimum set value.

In some cases, for reasons of automatic control engineering, it may be convenient not to update the set value during each iteration of the control loop. Thus, the contrast depth factor k from the control module 90 can be averaged during a number of iterations before an updated set value w is calculated and output to the control module 90. It may also be convenient only to permit updating of the set value within a desired-value interval.

It should also be pointed out that the stability criteria for the control system as a whole can be altered in relation to the control system in FIG. 6, for which reason the values of the control parameters $\alpha_1$, $\alpha_2$ are probably different. In a control system with constant poles, $\beta_1=0$ and $\beta_2=0.2$ have been found to give satisfactory results.

Figure 11:
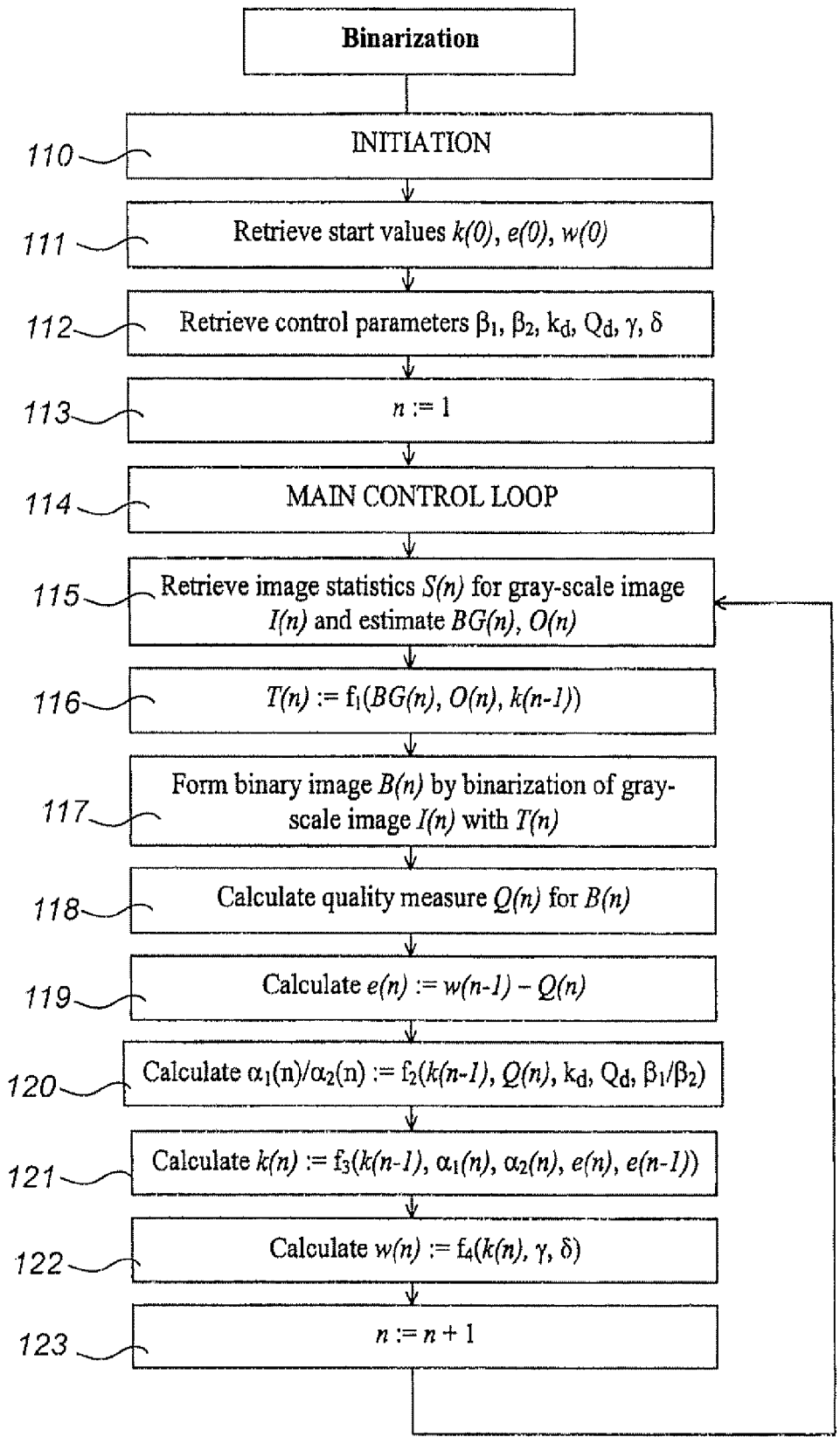
FIG. 11 is a flow chart which illustrates in detail an implementation of the second embodiment.

An implementation of the alternative embodiment according to the above will now be described with reference to FIG. 11.

An initiation 110 of the control module is first effected. In step 111, the control module retrieves start values, i.e. current contrast depth factor k(0), current error e(0) and current set value w(0). Typical values are k(0)=0.6; e(0)=0; w(0)=4.28. The start values k(0) and w(0) can be constant standard values or can be updated each time the pen is turned off, for example with the most recently calculated value of the contrast depth factor and the set value, respectively. In step 112, the control module retrieves the control parameters $\beta_1$, $\beta_2$.

A main counter n is reset to 1 in step 113, whereupon a main control loop is started in 114. In this connection, in step 115, the threshold calculation module retrieves image statistics S(n) which have previously been calculated by the statistics module on a current gray-scale image I(n). On the basis of the image statistics S(n), the threshold calculation module estimates a background matrix BG(n) and an object matrix O(n) containing background luminance values and object luminance values, respectively, for given partial areas in the gray-scale image I(n). In step 116, the threshold calculation module thus calculates the threshold matrix T(n) based on the background matrix BG(n), the object matrix O(n) and the contrast depth factor k(n−1).

In step 117, the segmentation module retrieves the gray-scale image I(n), if this has not already been done, and the threshold matrix T(n), whereupon the gray-scale image I(n) is binarized using the threshold matrix T(n). The result is a current binary image B(n).

Thereafter, in step 118, the analysis module processes the binary image B(n) and calculates the average object size Q(n) within this.

In step 119, the control module retrieves the calculated average object size Q(n) and calculates the difference, or the error, e(n) between the current set value w(n−1) and the average object size Q(n). In step 120, the control module calculates $\alpha_1(n)$ and $\alpha_2(n)$ starting from k(n−1), Q(n) and the control parameters $\beta_1$ and $\beta_2$, respectively. In this example, Q(n) is thus used to parameterize the model function. Finally, in step 121, the control module calculates k(n) on the basis of k(n−1), $\alpha_1(n)$, $\alpha_2(n)$, e(n) and e(n−1).

Thereafter, in step 122, the calculation module for the set value (reference number 92 in FIG. 9) retrieves the updated contrast depth factor k(n) and calculates a new set value w(n), which is thereafter retrieved by the control module. Here, the calculation module can be designed to calculate the new set value as a function of a mean value of a number of preceding contrast depth factors.

Finally, the counter n is incremented in step 123, whereupon the execution returns to step 115 for a new iteration.

Alternative Embodiments

The above description is only intended to give one example of how the invention can be realized within the scope of protection defined by the appended claims.

For example, the control loop can be implemented as a PID regulator, i.e. a regulator which in addition to proportional (P) and integrating (I) control also effects derivative (D) control. Moreover, it is conceivable to use linear control systems of higher order than 1, and various types of non-linear control systems, for regulating the binarization process.

In addition, it should be emphasized that the above-mentioned partial areas can be of any shape, such as square, rectangular, triangular, rhombic, hexagonal, etc.

In the above example, a contrast depth factor is calculated on the basis of the whole of the binary image. However, it is possible instead to determine a contrast depth factor for each one of a number of control partial areas in the binary image, on the basis of a calculated quality measure for the respective control partial area. The resulting set of contrast depth factors can then be used for calculating the threshold matrix.

Further, the model function need not be a linear function, but can be any suitable function approximating the relation between the actual value and the exposure time, at least around the set value. Examples of such functions include: polynomial functions of suitable degree, exponential functions of suitable base, logarithmic functions of suitable base, cyclometric functions, trigonometric functions, and combinations thereof. If the model function includes more than two unknown parameters, it may however be necessary to identify further secondary conditions in order to be able to adjust or parameterize the model function in the control loop.

As regards the exemplifying position-coding pattern, it should be pointed out that the raster can have shapes other than orthogonal, such as a rhombic grid, for example with 60 degree angles, a triangular or hexagonal grid, etc. In addition, the marks can be displaced in directions other than along the raster lines. However, the invention is not in any way limited to the described position-coding pattern, and instead application for identification and decoding of other coding patterns is also conceivable.

In the example above, the pattern is optically readable and the sensor is thus optical. It will be appreciated, however, that the images which are processed according to the invention can be generated in another way, for example by detection of chemical, acoustic, magnetic, electromagnetic, capacitive or inductive parameters. Likewise, it will be appreciated that the invention can also be used for identification of light marks against a dark background.

Finally, it should be noted that the invention can be used in general for precise, rapid and memory-efficient identification of objects in a digital image included in a sequence of images.

The invention claimed is:

1. A method for identifying objects in a digital image included in a sequence of images, comprising the steps:
    comparing luminance values of a current digital image with at least one threshold value in order to create, on the basis of the comparison, a current binarized image;
    calculating a quality measure for the current binarized image; and
    updating, on the basis of said quality measure, said at least one threshold value for use in binarization of a subsequent image,
    wherein said steps are included in a control loop each iteration of the control loop comprising:
    retrieving the current image;
    estimating a contrast distribution of the current image;
    calculating said at least one threshold value, based on said contrast distribution and a contrast depth factor calculated during a preceding iteration;

creating the current binarized image on the basis of said at least one threshold value;

calculating the quality measure of the current binarized image;

calculating an error between a set value and the quality measure; and calculating a new contrast depth factor based on the preceding contrast depth factor and said error, and wherein the control loop operates with essentially constant poles.

2. The method as claimed in claim 1, wherein said at least one threshold value is associated with at least one partial area of the current image, wherein said at least one threshold value is updated on the basis of an object luminance value and a background luminance value defined by said at least one partial area of the current image.

3. The method as claimed in claim 2, wherein said at least one contrast depth factor indicates the relative position of the threshold value between the object luminance value and the background luminance value.

4. The method as claimed in claim 1, in which the quality measure is calculated for control partial areas of the current binarized image, and in which the contrast depth factor is determined for each of the control partial areas.

5. The method as claimed in claim 1, in which the quality measure represents the area of the objects in the current binarized image.

6. The method as claimed in claim 1, wherein said control loop is based on a model function relating the quality measure to the preceding contrast depth factor, wherein said method further comprises: intermittently adjusting the model function to a current operation condition, so that the control loop operates with essentially constant poles, independent of operation condition.

7. The method as claimed in claim 6, in which the model function is defined at least around the set value.

8. The method as claimed in claim 6, in which the model function is a linear function.

9. The method as claimed in claim 1, in which the control loop is based on a model function which relates the quality measure to the preceding contrast depth factor, which model function includes at least one model function operating point which is essentially common to all digital images in the sequence of images, the step of calculating a new contrast depth factor comprising the step of parameterizing the model function on the basis of the preceding contrast depth factor and said model function operating point.

10. The method as claimed in claim 9, in which the parameterizing of the model function includes setting the quality measure equal to the set value.

11. The method as claimed in claim 9, in which the parameterizing of the model function is further based on the quality measure which has been calculated for the current binarized image.

12. The method as claimed in claim 9, in which the model function is defined at least around the set value.

13. The method as claimed in claim 9, in which the model function is a linear function.

14. The method as claimed in claim 9, in which the control loop is given by:

$$\begin{cases} k(n) = k(n-1) + \alpha_1(n) \cdot (e(n) - e(n-1)) + \alpha_2(n) \cdot e(n) \\ e(n) = w - Q(n) \\ \alpha_1(n) = \beta_1 \cdot \dfrac{k(n-1) - k_d}{Q(n) - Q_d} \\ \alpha_2(n) = \beta_2 \cdot \dfrac{k(n-1) - 1}{Q(n) - Q_d} \end{cases}$$

where k is the contrast depth factor; w is the set value, Q is the quality measure; n is the iteration number; $\beta_1$, $\beta_2$ are constants; and $k_d$, $Q_d$ are the values of the contrast depth factor and the quality measure, respectively, at said model function operating point.

15. The method as claimed in claim 1, comprising the step of intermittently updating the set value on the basis of said quality measure.

16. The method as claimed in claim 1, comprising the step of intermittently updating the set value on the basis of the contrast depth factor.

17. The method as claimed in claim 1, in which said comparison is effected on the basis of a threshold matrix containing a plurality of said threshold values, each threshold value being designated for a respective partial area of the current image.

18. A device which identifies objects in an image, comprising at least one processor having logic configured to binarize a sequence of temporally distinct digital images, refine over the sequence of temporally distinct images at least one thresholding parameter utilizing a feedback control, and obtain a set value in the form of a quality measure of the images after the binarization, wherein each iteration of said feedback control comprises:

retrieving a current image;

estimating a contrast distribution of the current image;

calculating said at least one threshold parameter, based on said contrast distribution and a contrast depth factor calculated during a preceding iteration;

creating a current binarized image on the basis of said at least one threshold parameter;

calculating the quality measure of the current binarized image;

calculating an error between a set value and the quality measure; and calculating a new contrast depth factor based on the preceding contrast depth factor and said error, wherein the feedback control is configured to operate with essentially constant poles.

19. A computer program product stored in a computer-readable medium comprising a computer program with instructions for carrying out a method according to claim 1.

20. A hand-held apparatus for position determination, comprising a sensor for producing a sequence of images of a surface with a position-coding pattern, and a processing unit which is provided with a processor and is adapted to calculate a position on the basis of the position-coding pattern in the image, the processing unit comprising a computer program product according to claim 19.

21. A device for identifying objects in a digital image included in a sequence of images, comprising a control system including:

segmentation means which is adapted to retrieve at least one threshold value and compare luminance values of a current digital image with said at least one threshold value in order to create a current binarized image on the basis of the comparison; and control means which is adapted to calculate a quality measure for the current binarized image and, on the basis of the quality measure, to update said at least one threshold value;

wherein said segmentation means is adapted to retrieve the updated threshold value for use in binarization of a subsequent image, wherein said control system further includes a control loop, each iteration of the control loop comprising:

retrieving the current image;

estimating a contrast distribution of the current image;

calculating said at least one threshold value, based on said contrast distribution and a contrast depth factor calculated during a preceding iteration;

creating the current binarized image on the basis of said at least one threshold value;

calculating the quality measure of the current binarized image;

calculating an error between a set value and the quality measure; and calculating a new contrast depth factor based on the preceding contrast depth factor and said error, wherein the control loop is configured to operate with essentially constant poles.

* * * * *